United States Patent
Peacock (10) Patent No.: US 9,903,944 B2
(45) Date of Patent: Feb. 27, 2018

(54) TARGET DETECTION SYSTEM AND METHOD

(71) Applicant: QINETIQ LIMITED, Hampshire (GB)

(72) Inventor: Christopher John Peacock, Portsmouth (GB)

(73) Assignee: QINETIQ LIMITED, Hampshire (GB)

( * ) Notice: Subject to any disclaimer, the term of this patent is extended or adjusted under 35 U.S.C. 154(b) by 379 days.

(21) Appl. No.: 14/381,561

(22) PCT Filed: Mar. 4, 2013

(86) PCT No.: PCT/GB2013/000087
§ 371 (c)(1),
(2) Date: Aug. 27, 2014

(87) PCT Pub. No.: WO2013/132205
PCT Pub. Date: Sep. 12, 2013

(65) Prior Publication Data
US 2015/0109163 A1 Apr. 23, 2015

(30) Foreign Application Priority Data
Mar. 8, 2012 (GB) .................. 1204113.3

(51) Int. Cl.
*G01S 13/532* (2006.01)
*G01S 15/18* (2006.01)
(Continued)

(52) U.S. Cl.
CPC .............. *G01S 13/532* (2013.01); *G01S 7/41* (2013.01); *G01S 13/0209* (2013.01);
(Continued)

(58) Field of Classification Search
CPC ........ G01S 13/53–13/532; G01S 15/18; G01S 13/04; G01S 7/41; G01S 13/0209; G01S 17/107
See application file for complete search history.

(56) References Cited

U.S. PATENT DOCUMENTS 8,629,807 B2 * 1/2014 Wood ........................ G01S 7/03
342/372

FOREIGN PATENT DOCUMENTS

GB 2298330 A 8/1995

OTHER PUBLICATIONS

Hughes, P. K., et al., "A High-Resolution Radar Detection Strategy," IEEE Transactions on Aerospace and Electronic Systems 1983;AES-19(3):663-667.
(Continued)

*Primary Examiner* — Matthew M Barker
(74) *Attorney, Agent, or Firm* — Kenealy Vaidya LLP (57) ABSTRACT

Some embodiments are directed to methods of detecting a target that include: receiving signals reflected from a target of interest, the signals having a bandwidth large enough to provide a plurality of range cells along an expected target, and processing the received signal(s) by (i) determining the phases of contiguous groups of range cells, the group size selected to approximate to sizes of targets of interest, (ii) phase-shifting the returns within a group to increase constructive interference and thereby signal power; and (iii) combining the phase shifted returns to produce phase-adjusted combined returns, and performing a detection on those combined returns. Some embodiments may provide enhanced target detection capabilities. The process may be repeated for different potential target sizes, and may be performed either on real time data, or off-line on recorded data, and is applicable to both radar and sonar.

18 Claims, 7 Drawing Sheets

(51) Int. Cl.
    *G01S 13/64*     (2006.01)
    *G01S 7/41*     (2006.01)
    *G01S 13/02*     (2006.01)
    *G01S 13/04*     (2006.01)

(52) U.S. Cl.
    CPC .............. *G01S 13/04* (2013.01); *G01S 13/64* (2013.01); *G01S 15/18* (2013.01)

(56) References Cited

OTHER PUBLICATIONS

Liu, G., et al., "Moving Target Detection via Airborne HRR Phased Array Radar," IEEE Transactions on Aerospace and Electronic Systems 2001;37(3):914-924.

Norland, R., "Multipath scattering from complex targets," IEE Proc.—Radar, Sonar Navig. 2001;148(6):343-347.

Tang, J., et al., "Analysis of Extended Target Detectors," Proceedings of the IEEE 1996 National Aerospace and Electronics Conference (NAECON)1996;1:364-368.

Van Der Spek, G. A., "Detection of a Distributed Target," IEEE Transactions on Aerospace and Electronic Systems 1971;AES-7(5):922-931.

International Search Report for PCT Patent App. No. PCT/GB2013/000087 (dated May 24, 2013).

Written Opinion for PCT Patent App. No. PCT/GB2013/000087 (dated May 24, 2013).

Search Report for GB Patent App. No. 1204113.3 (dated Jul. 6, 2012).

\* cited by examiner

TARGET DETECTION SYSTEM AND METHOD

This application is a national phase filing under 35 C.F.R. § 371 of and claims priority to PCT Patent Application No. PCT/GB2013/000087, filed on Mar. 4, 2013, which claims the priority benefit under 35 U.S.C. § 119 of British Patent Application No. 1204113.3, filed on Mar. 8, 2012, which are hereby incorporated in their entireties by reference.

Objects detected by sensor systems generally comprise a multitude of radiation scattering centres of differing reflective cross sections which impart differing phase shifts upon incident radiation. A sensor having a range resolution greater than or equal to the radial extent of such an object will observe a composite backscatter interference pattern from all of the observable scattering centres within the target. For limited combinations of scatterer ranges and incident radiation frequencies, the power of the composite target reflection will be maximised due to constructive interference from the scatterer reflections. For other limited combinations the power of the composite target reflection will be minimised due to destructive interference from the scatterer reflections. In general, the power of the target reflection received by the sensor will be diminished to some extent by destructive interference. The present invention is concerned with improving the target detection capability of sensors in such scenarios.

Example Scenario: A Fixed Ground-Based Radar Detecting an Aircraft

As an aircraft moves through space, its orientation relative to a stationary ground-based radar varies over time (except for special, limited, cases in which an aircraft flies at constant range around the radar or radially towards or away from the radar). Typically, an aircraft will follow a nominally straight line trajectory at a nominally constant altitude. Such an aircraft will initially have a positive inbound radial speed and present at least a partial frontal aspect to the stationary radar. As the aircraft passes through the closest point of approach its radial speed becomes zero and typically presents a broadside and partial underside aspect to the radar. The aircraft then recedes from the radar and presents a partial tail aspect to the radar. During the flypast, the aircraft will be subject to turbulence and continual small attitude corrections, which further modify its orientation to the radar on the micro scale.

Changes in the orientation of the aircraft relative to the radar result in the following:

Changes in the relative ranges of its component scatterers from the radar

Changes in radar cross section (RCS) and reflection phase shift of each scatterer due to their shape and material Scatterers becoming obscured and revealed due to the shape of the aircraft Each of these alters the scatterer interference pattern, as do changes to the radar transmission frequency.

The above effects all contribute to the composite RCS of an aircraft, as observed by a radar having a range resolution similar to the radial extent of the aircraft, varying over time. Changes in the scatterer interference pattern can be manifested as a bright target plot that gradually disappears from a radar screen over several antenna scans only to return as a bright plot after several further scans.

Similar effects can be observed for objects larger than a radar's resolution cell (e.g., larger aircraft and ships) but having multiple significant scatterers within the sensor's range resolution.

The above observations are also generally applicable to sonar sensors with submarine and surface targets.

For mobile sensors, motion of the sensor can also contribute to the relative orientation of a target changing over time.

STATEMENT OF INVENTION

The wideband target detection technique of the present invention processes sub-target scatterer amplitude and phase information in order to maximise constructive interference, increasing the average return signal available for target detection.

To that end, a first aspect of the present invention provides a method of detecting a target comprising the steps of:

a) receiving signals reflected from a target of interest, the signals having a bandwidth large enough to provide a range resolution smaller than a largest dimension of a target of interest, and generating from those signals a set of high range resolution (HRR) returns each being associated with a particular range;

b) processing the received signal(s) by:
   i) grouping HRR returns contiguously by range, each group covering a total range spread of approximately similar dimension to target types of interest;
   ii) processing the HRR returns within a group to determine their phases;
   iii) phase-shifting the returns within a group to increase constructive interference and thereby signal power;
   iv) combining the phase shifted returns to produce phase-adjusted combined returns, and performing a detection on those combined returns.

Advantageously, processing under Step (b) may be repeated for different range spreads (group sizes) to cover multiple target sizes without any need to transmit or receive further signals. Thus, the invention can provide enhanced target detection for any particular range of target sizes by selecting an appropriate transmission bandwidth and performing Step (b) for group sizes commensurate with target extents of interest. Note that the group size does not have to exactly equal the dimension of the target being detected, and the bandwidth of the signal may be chosen to provide at least 2, 4, 8, 16 or 32 range cells across a target of interest. Note that the sizes of targets of interest will generally be known, and hence the invention used as appropriate when searching for any particular type of target.

Step (b) may also be repeated in a staggered fashion, e.g., by sliding a window corresponding to the group size along the range cells to accommodate and detect targets that would otherwise straddle in range the group boundaries, without any need to transmit or receive further signals.

The returns are preferably complex returns, containing both amplitude and phase information.

Advantageously, the HRR returns grouped in Step (b)(i) may additionally be combined to produce an unprocessed low range resolution (LRR) return, i.e. one that is not processed according to steps (b)(ii) to (b)(iv). That unprocessed combined return may then be processed in a conventional manner to perform a detection. This effectively acts as a detection as would be done according to standard, prior art techniques, and the step provides a convenient means of detecting targets with high signal to noise ratios using conventional processing in order to minimise the overall processing overhead.

The combining processes used in the generation of the phase-adjusted combined return of Step (b)(iv) and the unprocessed combined return as described in the above paragraph may be done by, e.g., summing the returns. The combining may also use windowing functions to reduce sidelobe effects. Such windowing functions are well known in the art, and will not be described further.

Detections on the unprocessed or phase-adjusted combined returns may be done in conventional fashion, such as using constant false alarm rate (CFAR) processing, a technique that is widely understood.

The processing may utilise Fourier analysis (such as with a fast Fourier transform) to convert the signals to the frequency domain, and hence the data to being range-Doppler information, with range on one axis and Doppler (i.e., Doppler bins) on another. In order to select which Doppler bin is most likely to contain the target and determine the phase adjustment for particular returns, the processing under Step (b)(ii) may utilise information based on (1) the Doppler frequency corresponding to the most powerful signal in the frequency domain, (2) a composite measure of the signal power in several range cells in the frequency domain, (3) pre-existing knowledge of the likely velocities of potential target types, (4) the formation and analysis of a velocity history for each potential target such as in a track-before-detect process, (5) some combination of the above or (6) some other measures.

Step (a) may be performed by using a dedicated transmitter, arranged to transmit a signal of chosen bandwidth, or by using a suitable independent transmitter, e.g. a non-cooperative emitter, such as in a passive sensing scenario.

According to a second aspect of the invention there is provided a system having at least an antenna, a receiver and a processor, wherein the antenna is arranged to receive signals reflected from a target of interest, the receiver is arranged to demodulate them, and pass demodulated signals to the processor, wherein the processor is arranged to process them using the method as described in any of Claims 1 to 15.

The system may also comprise a signal source, and transmitter arranged to transmit wideband signals towards a target, the bandwidth being large enough to provide a range resolution smaller than a largest estimated dimension of the target.

The system may be, for example, a radar or sonar.

The invention will be described, by way of example only, with reference to the following figures, of which.

The objective of the target detection technique as described in relation to embodiments of the present invention is to process returns from dominant scatterers within a target in order to maximise constructive interference, thereby increasing the observed power of the target and its detectability.

In an embodiment of the invention, a radar transmits, to a target, one or more coherent bursts of a wideband, HRR, pulsed waveform with a range resolution several times smaller than the extent of the target and processes reflected returns therefrom.

Figure 1:
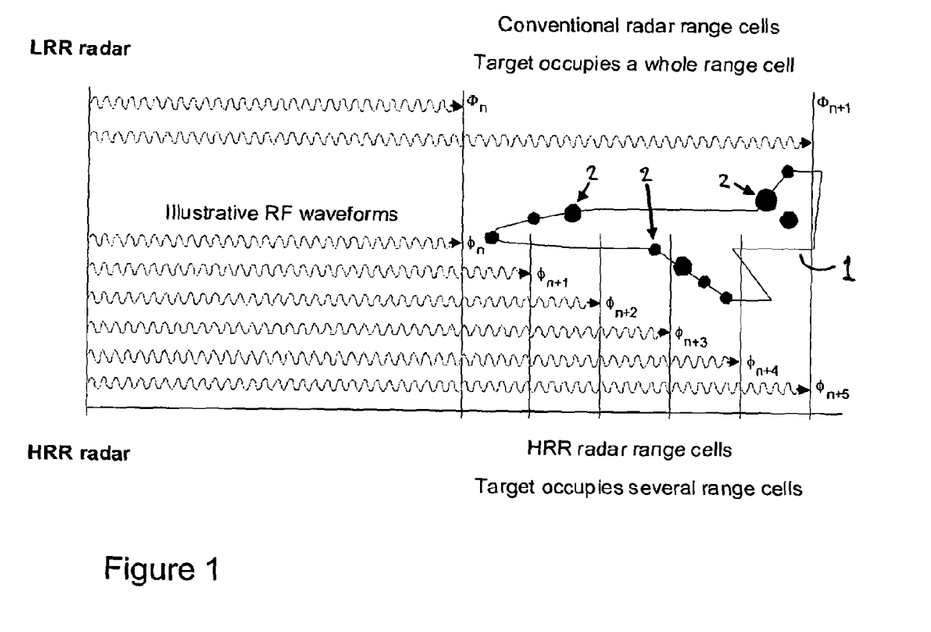
FIG. 1 illustrates the sensing of a multiple-scatterer target with both a conventional, LRR, radar and an HRR radar.

A comparative illustration of the relative scale of an example target and its constituent scatterers to the range cells within a conventional, LRR, radar and an HRR radar is given in FIG. 1. A target (1) comprises several (in this example ten) significant radiation scatterers (e.g. 2) of differing RCSs and reflective phase shifts throughout its length. The target (1) has a radial dimension occupying around a single range cell of the LRR radar, but several range cells in the HRR radar. In this example, the target (1) occupies 5 range cells in the HRR radar, but targets may occupy different numbers of HRR range cells, such as at least 2, 4, 8, 16 or 32, depending on the transmission resolution, the group size processed under Step (b) and the range extent of the target.

The radar return pulses from the target (1) are processed to provide raw In-phase and Quadrature (IQ) values, to retain the phase information along with the amplitude information. Such IQ processing is known in the art, and will not be described further.

The target detection processing on the IQ data involves two stages:

Stage 1

Figure 2:
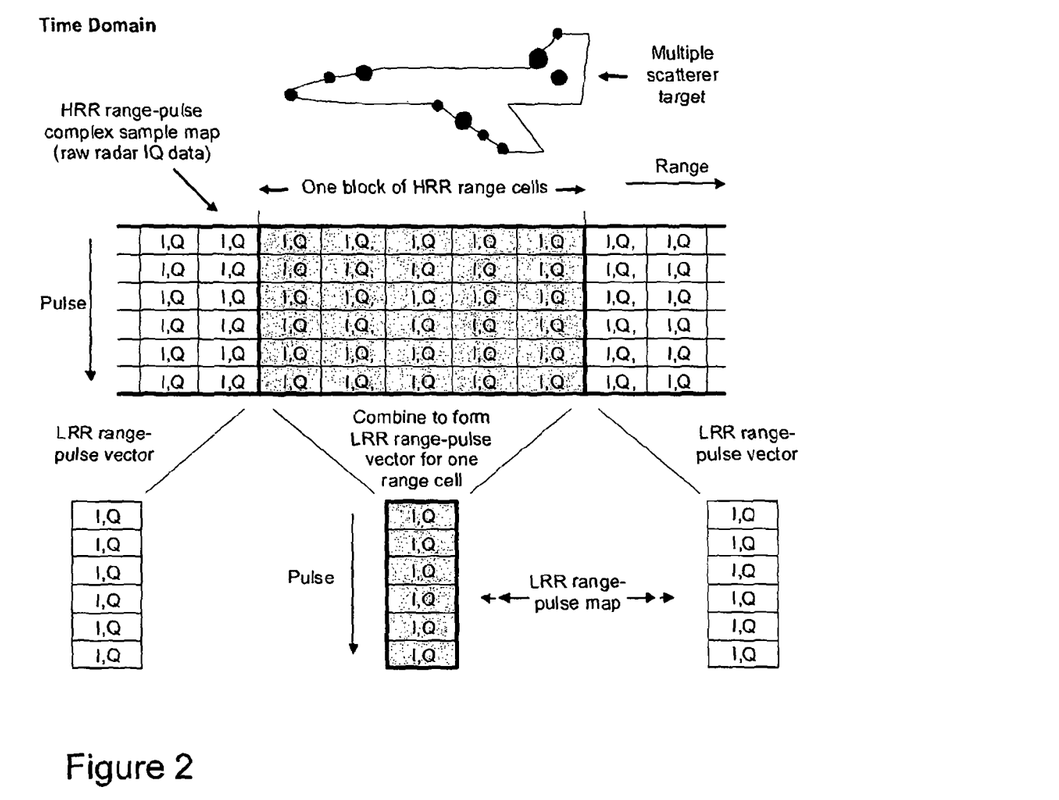
FIG. 2 illustrates the generation of a group (block) of HRR range-pulse samples and the corresponding LRR range-pulse vector.

The HRR range cells are grouped into blocks (which, for this example, are equivalent to the groups described earlier) having a combined range extent commensurate with the typical range extent of targets of interest, as shown in FIG. 2. The radar return signals for each HRR range sample for each pulse (i.e., each row of IQ data) within each block of range cells are summed, optionally using a window function, to form a composite LRR range-pulse vector. The LRR pulse vectors for all blocks together form the LRR range-pulse map. In the example of FIG. 2 there are 5 HRR range samples per LRR block and 6 pulse returns are employed in each block processing step.

The LRR range-pulse map is subjected to Fourier processing to form a LRR range-Doppler map which is broadly equivalent to the range-Doppler map that could be obtained using a conventional LRR radar. The resultant frequency domain returns for each LRR range cell are processed using two parallel conventional target detection algorithms having different false alarm rates (FARs). The lower FAR is consistent with conventional, LRR, target detection, and is associated with higher signal to noise ratios being present in the returns from the radar. The higher FAR is consistent with detecting difficult-to-observe targets, and is conversely associated with lower signal to noise ratios.

Composite LRR range cells that yield normal target detections, i.e., using the lower FAR, are processed in the conventional manner.

Composite LRR range cells that fail to yield normal target detections but are detected using the higher FAR are processed in the second detection stage (see below), which confirms genuine target detections and filters out false alarms.

Stage 2

Blocks of range cells, which may correspond to the blocks used in Stage 1, are processed in the Doppler domain to determine the most likely Doppler bin for a potential target. This may be determined in a number of different ways as follows:

- As the single HRR Doppler bin that contains the most power within the HRR block;
- As the composite LRR Doppler bin that contains the most power within the LRR range-pulse vector;
- Using pre-existing knowledge of the likely velocities of potential target types;
- By forming and analysing a velocity history for each potential target such as in a track-before-detect process;
- Using some combination of the above, optionally iterated within the process described below or
- Using some other measure.

Figure 3:
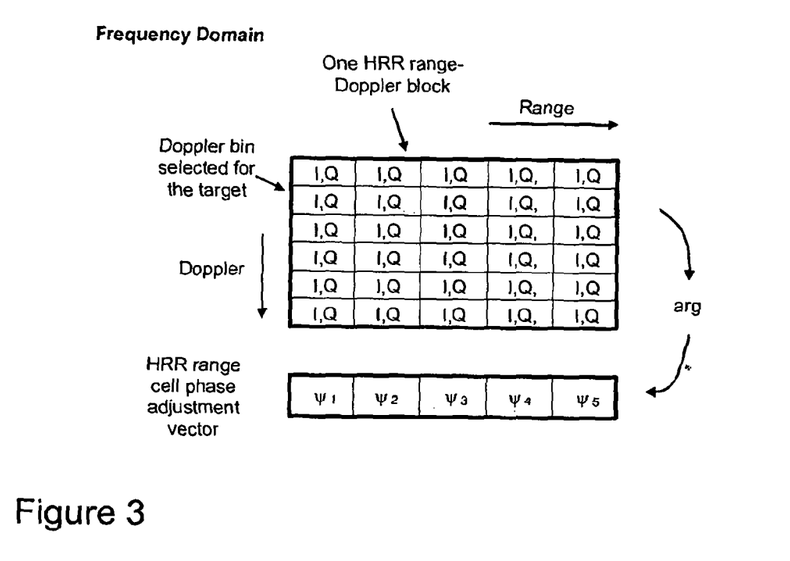
FIG. 3 illustrates the generation of a phase adjustment vector from HRR range-Doppler data.
Figure 4:
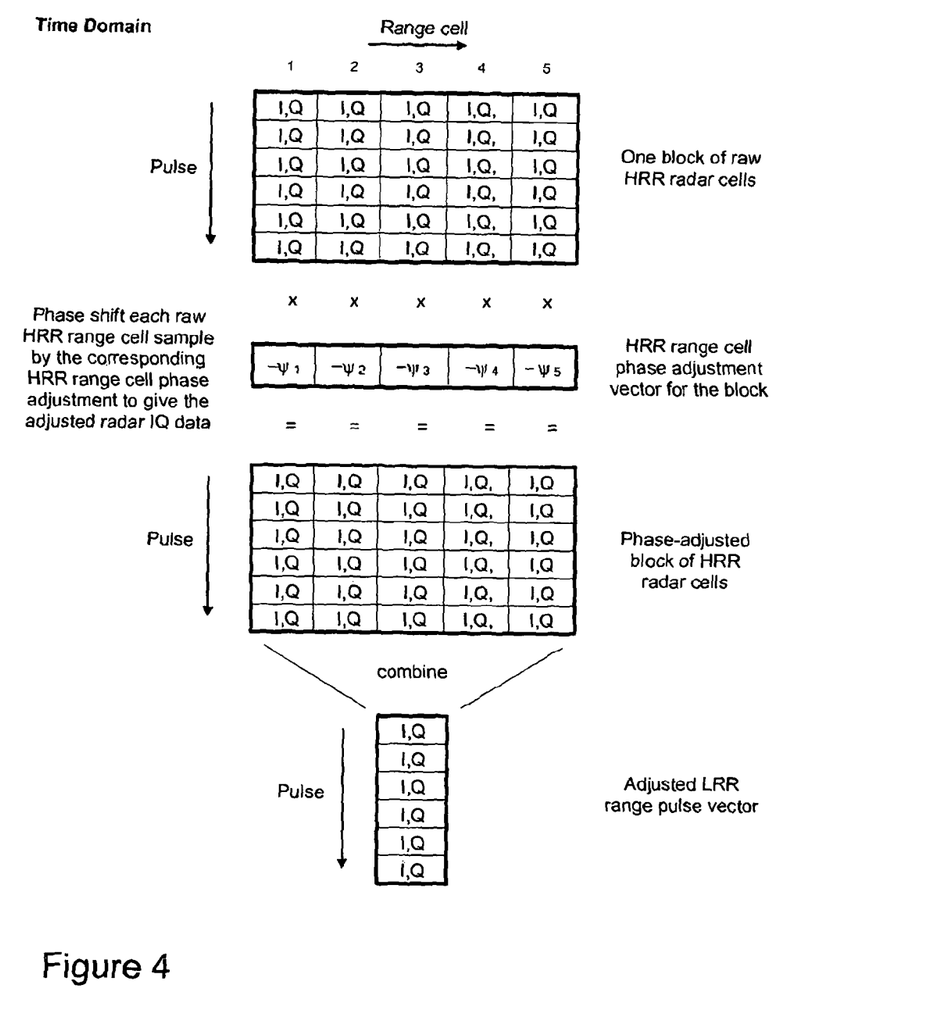
FIG. 4 illustrates the adjustment of raw time-domain radar data by the phase adjustment vector and the corresponding compensated LRR range-pulse vector.

The phases of the raw IQ signals in each of the HRR range cells for the selected Doppler bin within a particular block are determined, such as by using Fourier analysis to determine the complex components of the corresponding frequency domain signals, to form a vector comprising one phase angle for each range cell in the block, as illustrated in FIG. 3. Each time domain raw HRR IQ sample in the block is then adjusted by the inverse of the phase angle for the corresponding range cell in the above-mentioned phase vector, i.e., such that raw HRR IQ samples at the same range are all adjusted by the same phase, as illustrated in FIG. 4. Consequently, the time domain HRR samples become aligned in phase with respect to the selected Doppler bin. This alignment of signal phases maximises the constructive interference within the HRR range cells, as illustrated by comparing FIG. 5 (before phase adjustment) with FIG. 6 (after phase adjustment).

Figure 5:
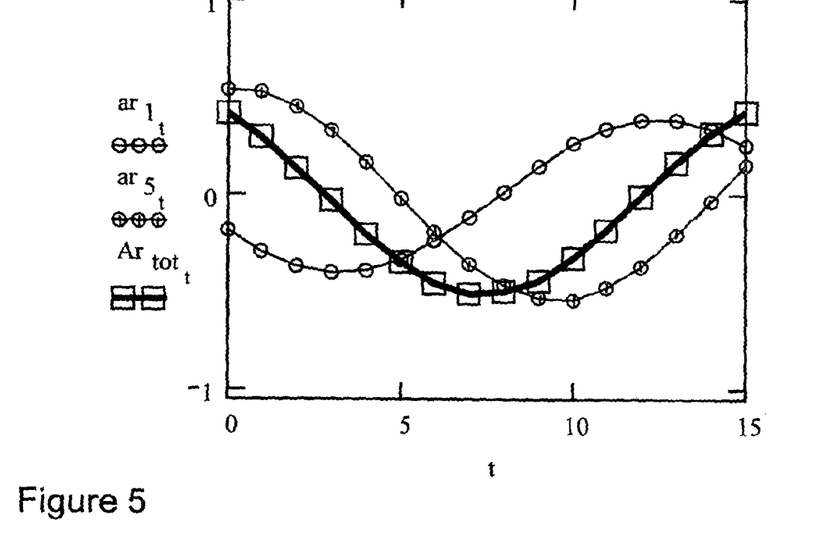
FIG. 5 shows example HRR and composite LRR returns from a target for a coherent burst of pulses.

FIG. 5 shows example returns from two scatterers (which lie within range cells 1 and 5 within a block) on a moving target, from a coherent burst of 16 wideband pulses. These are shown as the two traces having points marked with small circles, and correspond to the real components of Rows 1 and 5 in a block of HRR range-pulse cells (refer to FIG. 2, noting that it illustrates only 6 pulses per block). The third trace of FIG. 5, in bold and with square markers, represents the sum of the individual scatterer traces, i.e., the unprocessed LRR range-pulse vector for the block. It can be seen that there is a phase difference between the individual scatterer traces, which results in the sum trace being smaller in amplitude than it otherwise would be if the individual scatterers were aligned in phase. This, therefore, is the result that would be achieved by a prior art system using an LRR radar.

Figure 6:
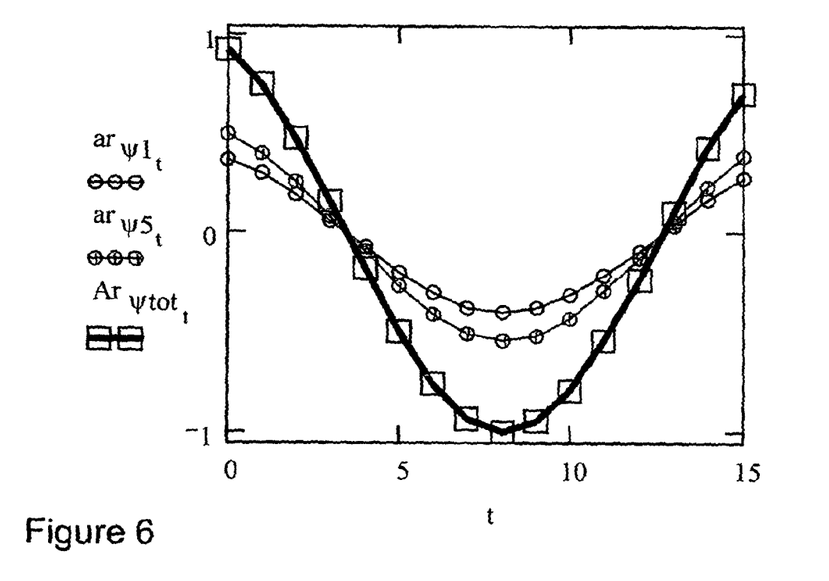
FIG. 6 shows phase-adjusted HRR and composite LRR returns from a target for a coherent burst of pulses.

In FIG. 6 the two traces indicated by small circles represent the scatterer HRR returns of FIG. 5 after being aligned in phase using the technique described above, and correspond to the real components of Rows 1 and 5 in the phase-adjusted block of HRR radar cells (refer to FIG. 4). The third trace of FIG. 6, in bold and with square markers, is the sum of the phase-aligned individual scatterer traces, i.e., the phase-adjusted LRR range-pulse vector for the block. It can be seen that this trace is much larger in amplitude than the sum trace of FIG. 5.

Figure 7:
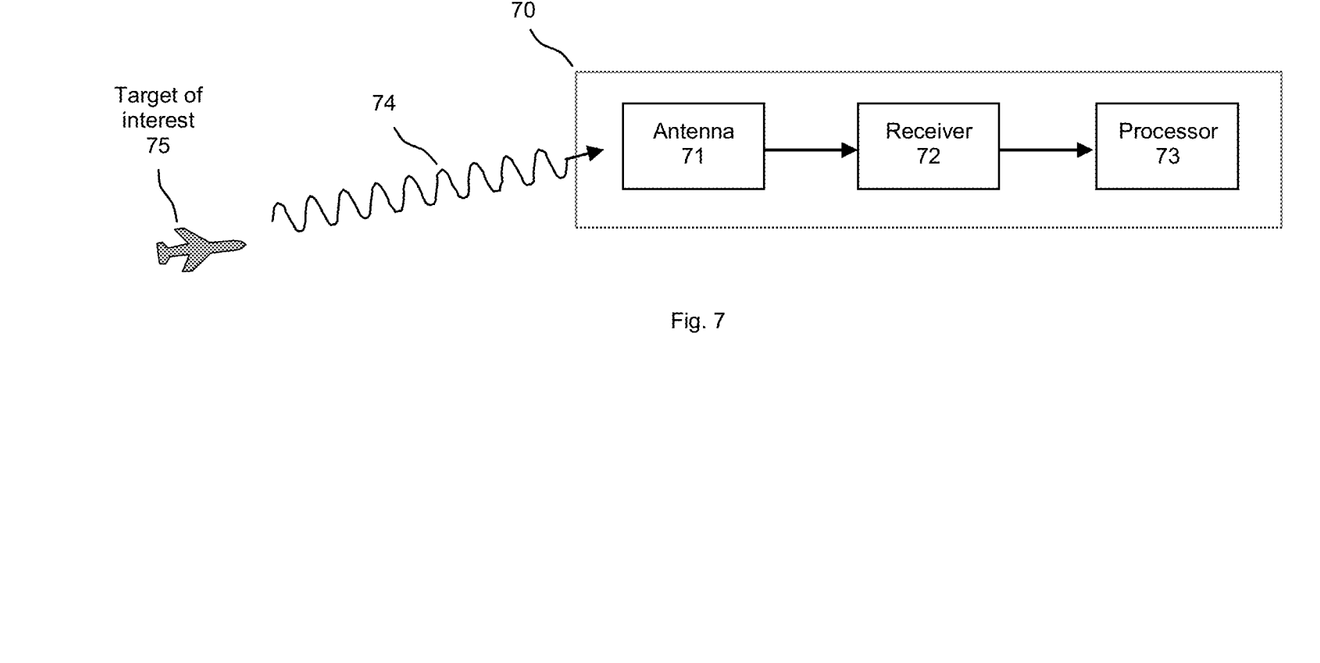
FIG. 7 is a schematic of a top level hardware arrangement of an embodiment of the invention.

FIG. 7 shows a top level hardware arrangement of an embodiment of the invention. A system 70 has at least an antenna 71, a receiver 72 and a processor 73, wherein the antenna is arranged to receive signals 74 reflected from a target of interest 75, the receiver being arranged to demodulate them, and pass demodulated signals to the processor. The processor is arranged to detect a target of interest by:

i) grouping HRR returns contiguously by range, each group containing a plurality of range cells covering a total range spread of similar dimension to a target type of interest;
ii) processing the HRR returns within a group to determine their phases;
iii) phase-shifting the HRR returns within a group to increase constructive interference between the HRR returns, and composite power therein, as compared to non-phase shifted returns; and
iv) combining the phase shifted HRR returns to produce phase-adjusted combined returns of increased amplitude, and performing a detection using those combined returns to detect the target.

Figure 8:
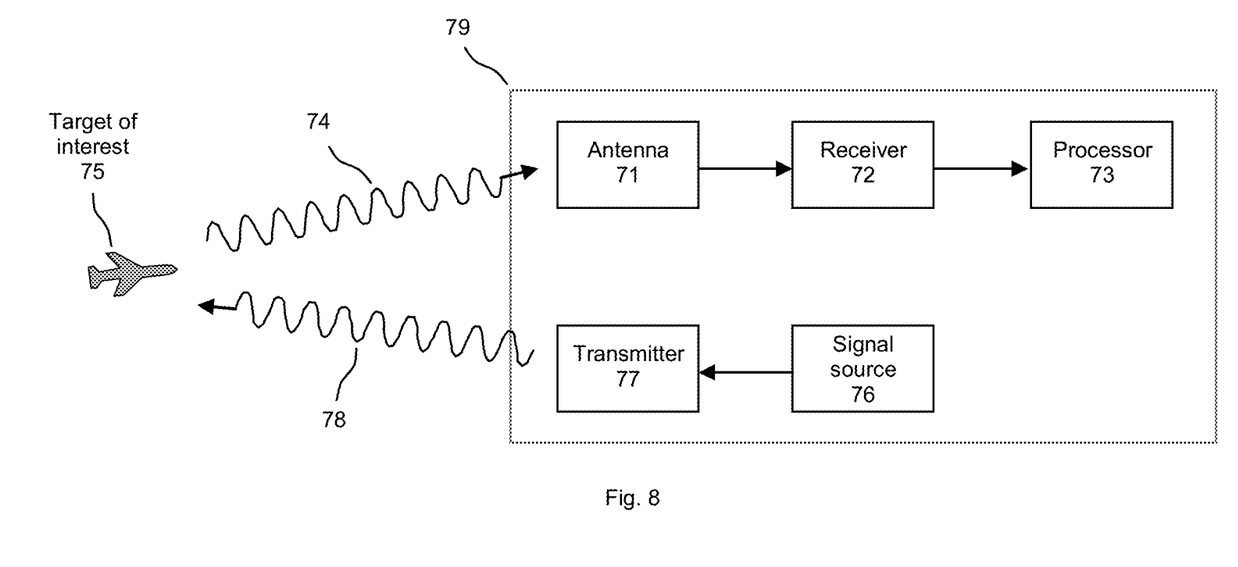
FIG. 8 is a schematic of a top level hardware arrangement of a further embodiment of the invention.

FIG. 8 shows a further embodiment, including a system 79 having (as well as the antenna 71, receiver 72 and processor 73 as in FIG. 7) a signal source 76, and transmitter 77 arranged to transmit signals 78 towards a target 75, the bandwidth being large enough to provide a range resolution smaller than a largest estimated dimension of the target 75.

Noise in the return signals will also be phase shifted, but any change in the interference pattern due to the phase shifting of noise signals will be a random process averaged across all of the range and pulse bins that may result in a small increase or small decrease in overall constructive interference. Since the target amplitude is increased markedly and the noise amplitude affected only slightly, the technique provides an increase in the signal to noise ratio for a target.

The phase-adjusted HRR signals are then used to determine target detections. This may be accomplished:

- By combining the phase-adjusted HRR returns in blocks to form composite enhanced LRR returns (similarly to the Stage 1 process) and subjecting those returns to target detection using the above-mentioned lower FAR
- Using frequency-domain CFAR detection
- Using variable target-length range CFAR
- Using multiple hypothesis techniques
- Using a combination of the above
- Using some other means Points of Note The technique achieves signal gain because it isolates and processes separately returns from the main scatterers within a target.

The potential for scatterer returns within a resolution cell destructively interfering reduces as the resolution cell size reduces to a dimension less than the typical spacing between the most dominant scatterers. Therefore, HRR sensing generally accumulates more energy than LRR sensing. The technique correlates the phases of individual HRR samples to increase the signal level processed in the target detection chain. The technique aims to maximise constructive interference in the selected Doppler bin for the case of a rigid body target which does not significantly vary its orientation to the radar within a block processing step.

As the range resolution is increased, further detail of the scatterers within the target is revealed, providing further potential for maximising the constructive interference gain. This is achieved at the cost of additional processing.

The best results are obtained for radar Swerling cases 1 and 2, which represent targets containing multiple scatterers of roughly similar amplitude.

Although the application has been described in detail with relation to radar signals, it is equally applicable to sonar systems. It will also improve the performance of radar and sonar target tracking functions since target detections will be less likely to drop-out.

The invention claimed is:

1. A system comprising:
an antenna; and
a receiver and a processor,
wherein the antenna is configured to receive signals reflected from potential targets of interest, the signals having a bandwidth large enough to provide a range resolution smaller than a largest dimension of the target of interest, the receiver is configured to demodulate the signals and generate a set of high range resolution (HRR) returns each containing phase and amplitude information associated with the signals from a particular range cell, and pass the information to the processor, wherein the processor is configured to detect a target of interest by processing the HRR returns by:
  i) grouping HRR returns contiguously by range, each group containing a plurality of range cells covering a total range spread of similar dimension to a target type of interest;
  ii) processing the HRR returns within a group to determine their phases;
  iii) phase-shifting the HRR returns within a group to increase constructive interference between the HRR returns, and composite power therein, as compared to non-phase shifted returns; and
  iv) combining the phase shifted HRR returns to produce phase-adjusted combined returns of increased amplitude, and performing a detection using those combined returns to detect the target.

2. The system according to claim 1, the processor being further configured to repeat steps (i) to (iv) using different group sizes (range spreads) to cover multiple target sizes.

3. The system according to claim 1, the processor being further configured to repeat steps (i) to (iv) using a sliding window to accommodate and detect targets that would otherwise straddle in range boundaries of the groups, without any need to receive further signals.

4. The system according to claim 1, further configured to combine the HRR returns grouped in step (i) to form low range resolution (LRR) unprocessed returns, and configured to perform a detection on the unprocessed returns.

5. The system according to claim 4, further configured to carry out the detection on the unprocessed combined return using a constant false alarm rate (CFAR) processing algorithm.

6. The system according to claim 1, processor being further configured to perform the combining step by summing the returns.

7. The system according to claim 1, further configured to multiply the grouped returns by a windowing function.

8. The system according to claim 1, further configured to carry out the detection on the phase-adjusted combined returns using a constant false alarm rate (CFAR) processing algorithm.

9. The system according to claim 1, further configured to process, under step (ii), utilizing information based on one of:
  (i) the Doppler frequency corresponding to the most powerful signal in the frequency domain within the group,
  (ii) a composite measure of the signal power in the frequency domain in a plurality of range cells within the group,
  (iii) pre-existing knowledge of the likely velocities of potential target types,
  (iv) the formation and analysis of a velocity history for each potential target, or
  (v) a combination of the above,
  and further configured to select a Doppler bin that is most likely to contain the target and determine the phase adjustment for particular returns.

10. The system according to claim 9, further configured to determine the phases of the HRR returns in each of the HRR range cells for the selected Doppler frequency bin within a particular block using Fourier analysis to determine complex components of the corresponding frequency domain signals.

11. The system according to claim 1, further configured to utilize Fourier analysis in the processing to convert the signals to the frequency domain, to generate range-Doppler information.

12. The system according to claim 1, further configured to calculate a separate phase angle for each range cell in each group of HRR range cells.

13. The system according to claim 12, further configured to adjust each HRR time domain return in each group by the phase angle for the corresponding range cell.

14. The system according to claim 13, further configured to determine the phase adjustment for the HRR returns within each range cell as the phase angle of a Doppler bin for that range cell.

15. The system according to claim 1, wherein the antenna is configured to receive the signal and to provide it to the receiver, and said received signal is a reflection from a target of a signal transmitted by an independent transmitter that does not co-operate with the receiver.

16. The system according to claim 1, wherein the system further incorporates a signal source and transmitter, for generating and transmitting a signal, the bandwidth of the signal being large enough to provide a range resolution smaller than a largest estimated dimension of the target of interest.

17. The system according to claim 16, wherein the transmitted signals are one of: electromagnetic signals, and acoustic signals.

18. The system according to claim 1, further configured to combine the phase shifted HRR returns of step (iii) within each group to produce phase-adjusted combined returns for that group, and to process the phase-adjusted combined returns from a plurality of groups to detect the presence of targets.

* * * * *